Aug. 5, 1924.  1,503,618
S. G. WINGQUIST
HYDRAULIC COUPLING AND CHANGE SPEED GEAR
Filed Sept. 16, 1922  2 Sheets-Sheet 1
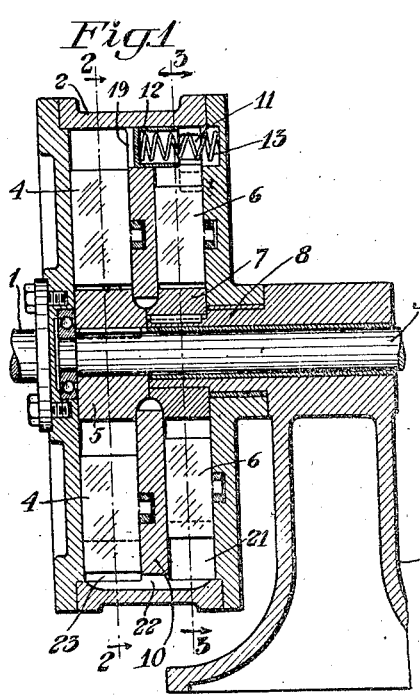
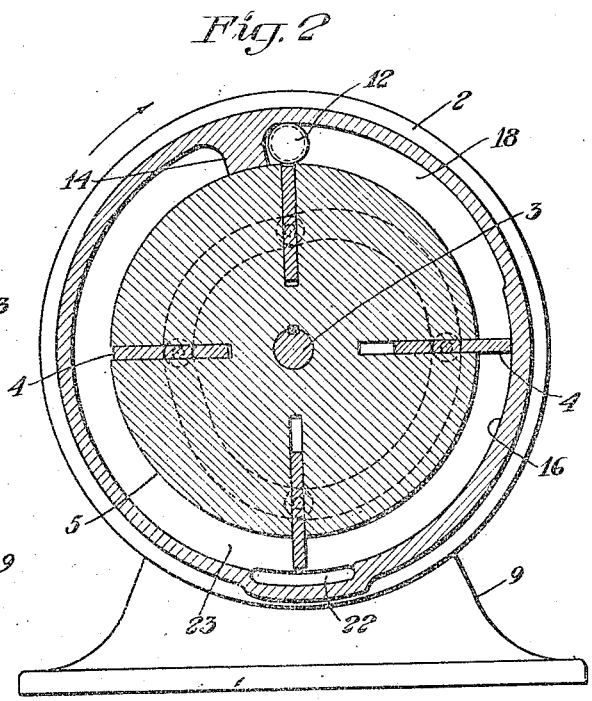
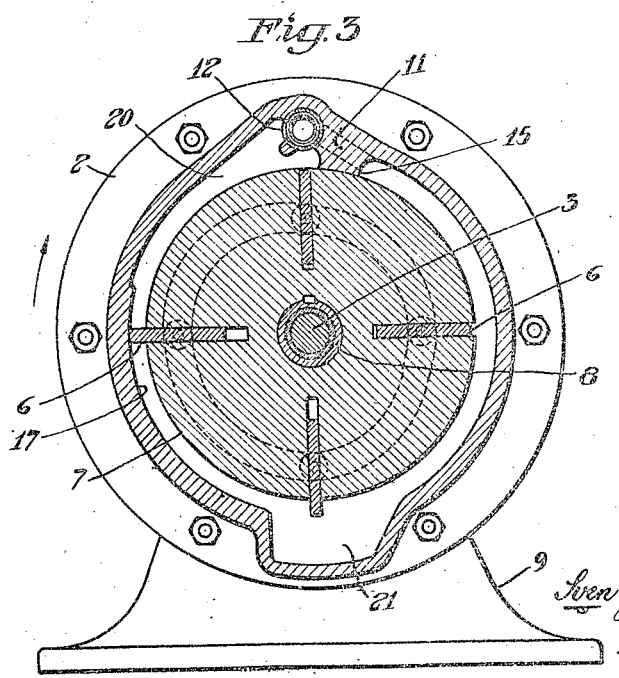
Inventor
Sven Gustaf Wingquist
By Attorneys

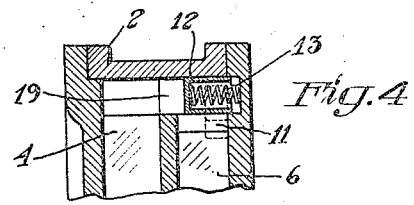
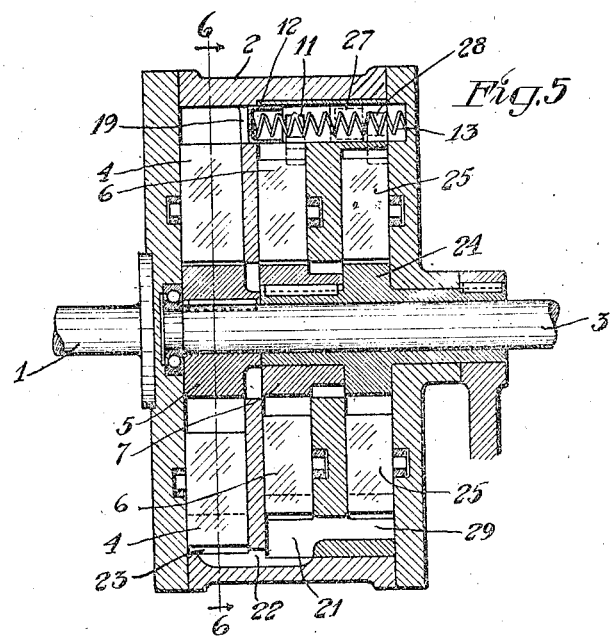
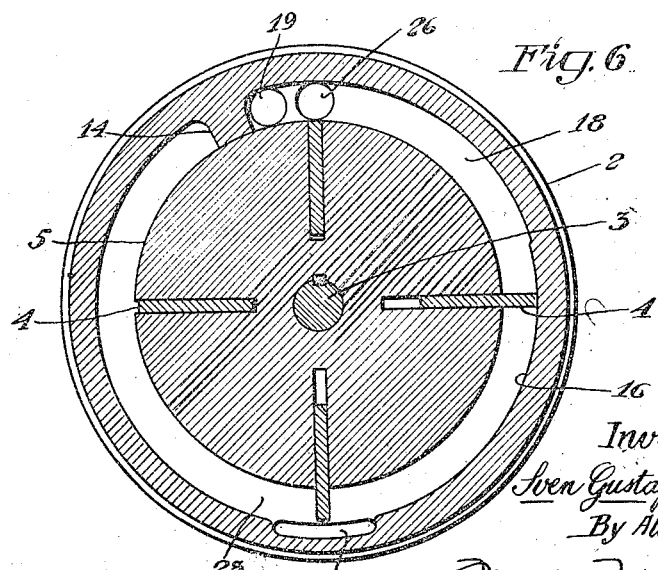

Patented Aug. 5, 1924.

1,503,618

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed September 16, 1922. Serial No. 588,656.

*To all whom it may concern:*

Be it known that I, SVEN GUSTAF WINGQUIST, a subject of the King of Sweden, residing at Gottenborg, in the Kingdom of Sweden, have invented new and useful Improvements in Hydraulic Couplings and Change-Speed Gears, of which the following is a specification, reference being had to the drawing accompanying and forming a part thereof.

This invention relates to hydraulic couplings and change speed gears consisting of one or more pump elements or systems of pump elements, and provided with controlling means by the adjustment of which the different steps of coupling may be obtained.

The object of the invention is to perform the said steps of coupling automatically.

The invention consists, chiefly, in this that the said controlling means are acted on, directly, by the fluid pressure existing in the pressure chamber of the gear, so that the steps of coupling will be dependent on the pressure existing in the said chamber, i. e., on the turning moment of the driven part of the gear.

Further, the controlling means may, preferably, be arranged in such manner so as to be moved, below a certain pressure in the pressure chamber, through the action of springs or the like, back to the position, in which a direct drive exists between the driving and the driven part of the gear, the so-called position of rest.

Further, in case of the gear being carried out for a number of transmission ratios the controlling means are arranged in such manner so as to be active at different pressures, so that the transmission ratio will increase, successively, with the pressure.

In the drawings annexed hereto, wherein I have shown two embodiments of a hydraulic coupling and change speed gear according to this invention; Fig. 1 is an axial section of the gear. Fig. 2 is a transverse view of the delivery pump, taken along the line 2—2 of Fig. 1 in the direction of the arrows. Fig. 3 is a similar view of the receiving pump, taken along the line 3—3 of Fig. 1 in the direction of the arrows. Fig. 4 is a detail view of Fig. 1, showing the control valve in open position. Fig. 5 is a view similar to Fig. 1 showing a gear with two receiving pumps. Fig. 6 is a transverse view of the delivery pump taken along the line 6—6 of Fig. 5 in the direction of the arrows.

In the form of embodiment shown in Figs. 1 to 4, which consists of two pumps of the ordinary sliding vane type, 1 designates a driving shaft which is rigidly secured to an outer casing 2 which constitutes the driving rotor of the change speed gear. Rotatably mounted in the said casing is a driven shaft 3 to which is rigidly connected a rotor 5 provided with radially movable vanes 4 which together constitute the driven rotor of the gear. Mounted in the casing 2 is, further, a stator 7 provided with radially movable vanes 6 and which is, in the form of embodiment shown, keyed to a sleeve-like projection 8 of a frame 9. The projection 8 also serves as a journal for the rotary casing 2.

The pump 2, 5 as herein disclosed may be considered the delivery pump of the device and the pump 2, 7 the receiving pump, the former having an abutment 14 and working face 16 and the latter an abutment 15 and a working face 17. Between the two pumps is a partition wall 10 which is carried by the rotor casing 2 and as herein shown is integral therewith. Within the partition is a valve chamber in which is positioned a piston valve 12 controlled by a helical spring 13, said valve governing the passages 11 and 19, the former being adapted to establish communication between the pressure chamber 20 and suction chamber 21 of the pump 2, 7, and the latter adapted to establish communication between the pressure chamber 18 of the pump 2, 5 and the pressure chamber 20 of the pump 2, 7. There is also provided a passage 22 which connects with the suction chambers 21 and 23 respectively of the pumps 2, 7 and 2, 5 and thus provides for a circulation of the fluid during the operation of the device.

The operation of the device is as follows:

Supposing the driving shaft 1 with the housing 2 to be rotated in the direction of the arrow, shown in Figs. 2 and 3, and supposing further the driven shaft 3 carrying the rotor 5 with the vanes 4 to be exposed to a load, there will arise a pressure in the chamber 18 of the delivery pump 2, 5 between the abutment 14 and the adjacent vane 4. Supposing, further, the pressure controlled valve 12 to shut off the pressure channel 19 between the delivery pump 2, 5 and the receiving pump 2, 7, as shown in Fig. 1, the fluid contained in the said chamber 18 will be entirely trapped, and the rotor 5 with the shaft 3 will be rotated with the same speed and in the same direction as the housing 2 with the driving shaft 1. As in the present case the stator body 7 with the vanes 6 is stationary, i. e., cannot rotate with the housing 2, a circulation of liquid takes place through passage 11 which connects the pressure and suction chambers of the receiving pump 2, 7.

If, then, the load to be driven be increased, also the pressure in the pressure chamber 18 of the delivery pump 2, 5 increases. At a certain value said pressure overcomes the tension of the spring 13 and moves the valve 12 towards the right in Fig. 1, the pressure channel 19 between the two pumps 2, 5 and 2, 7 being in this case opened, and simultaneously, the conduit 11 in the abutment 15 of the receiving pump 2, 7 will be closed, as apparent from Fig. 4.

Thus, part of the fluid of the delivery pump 2, 5 will be admitted through the channel 19 to the chamber 20 of the receiving pump 2, 7 causing a corresponding slip of the driven rotor 5 with relation to the driving rotor 2 and causing also a pressure in the chamber 20 of the receiving pump 2, 7. As the stator 7 cannot move, a reaction force due to said pressure will be exerted on the abutment 15, i. e., on that side of the abutment, which confines the one end of said chamber 20, and the said reaction force will be transmitted through the rotor body 2 to the abutment 14 of the delivery pump 2, 5 and from there through the fluid in the chamber 18 to the vanes of the driven rotor 5, thereby causing an increased torque of said rotor corresponding to its slip, i. e., to the transmission ratio, which depends in known manner on the relation between the volumetric capacities of the two pumps 2, 5 and 2, 7.

The fluid in the pump 2, 7 escapes at 21 in Figs. 1 and 3, through the channel 22, Figs. 1 and 2, to the suction chamber 23 of the delivery pump 2, 5, a circulation of the fluid taking place between the two pumps, it being understood that the interior of the device is entirely filled with fluid—(preferably oil).

When again shutting off the connection 19 between the two pumps, which will occur automatically by means of the spring 13, when the pressure in the chamber 18, i. e., the load to be driven drops below a certain value, a direct drive will be obtained, as described above.

The form of embodiment shown in Figs. 5 and 6 differs from that according to Figs. 1 to 4 in this respect only that a second receiving pump has been added, comprising a stator body 24 having radially movable vanes 25 and co-operating with an abutment and a working surface formed in the common rotor 2 in the same manner as described with reference to Fig. 3. Leading between the delivery pump 2, 5 and the said second receiving pump 2, 24 there is a pressure channel 26, Fig. 6, controlled by a separate pressure actuated valve 27, Fig. 5, there being a conduit 28, similar to the conduit 11 in the former case, in the abutment between the pressure chamber and the suction chamber of the pump 2, 24, said conduit 28 being controlled by the pressure actuated valve 27 in the same manner as is the conduit 11 controlled by the valve 12.

The difference as to the action of this gear and that according to Figs. 1 to 4 consists in this that, if the valve 12 opens the channel 19 between the delivery pump 2, 5 and the first receiving pump 2, 7 at a certain fluid pressure, i. e., at a certain load, the valve 27 will open the channel 26 between the delivery pump 2, 5 and the second receiving pump 2, 24 at a certain higher pressure, thereby producing a second transmission ratio.

In this case, the fluid escapes at 29, Fig. 5, through the chamber 21 of the first receiving pump 2, 7 and through the channel 22 to the suction chamber 23 of the delivery pump 2, 5, a circulation of the fluid taking place between said last mentioned pump 2, 5 and the receiving pumps 2, 7 and 2, 24.

While I have herein shown and described two embodiments of my invention, it will be understood that various changes may be made therein without departing from the spirit of the invention.

I claim:

1. A hydraulic coupling and change speed gear, comprising a delivery pump and at least one receiving pump, a connection between said delivery pump and said receiving pump, said pumps being formed by a driving rotor, a driven rotor and a stator, one of said rotors being common to all said pumps, a valve disposed in the said connection and controlled by the fluid pressure set up in said delivery pump to open said connection.

2. A hydraulic coupling and change speed gear, comprising a delivery pump and at least one receiving pump, a connection between said delivery pump and said receiving pump, said pumps being formed by a driving rotor, a driven rotor and a stator, one of said rotors being common to all said pumps, a spring actuated valve disposed in the said connection and controlled by the fluid pressure set up in said delivery pump to open said connection and counteract the force of said spring.

3. A hydraulic coupling and change speed gear, comprising a delivery pump and a plurality of receiving pumps, and connections between said delivery pump and said receiving pumps, said pumps being formed by a driving rotor, a driven rotor and a stator, one of said rotors being common to all said pumps, valves disposed in the connections between the delivery pump and the several receiving pumps and controlled by the fluid pressure set up in said delivery pump to successively open the said connections at different fluid pressures.

4. A hydraulic coupling and change speed gear, comprising a delivery pump and a plurality of receiving pumps, and connections between said delivery pump and said receiving pumps, said pumps being formed by a driving rotor, a driven rotor and a stator, one of said rotors being common to all said pumps, valves disposed in the connections between the delivery pump and the plurality of receiving pumps and controlled by the fluid pressure set up in said delivery pump to successively open the said connections at different fluid pressures, and springs adapted to successively close said valves, as the fluid pressure drops.

5. A hydraulic coupling and change speed gear according to claim 1, in which the pumps are of the sliding vane type.

In testimony whereof I have signed my name.

SVEN GUSTAF WINGQUIST.